United States Patent

[11] 3,626,111

[72] Inventors Georges A. Duval
Fresnes;
Jean F. Vigne, Montgeron, both of France
[21] Appl. No. 820,413
[22] Filed Apr. 30, 1969
[45] Patented Dec. 7, 1971
[73] Assignee International Standard Electric Corporation
New York, N.Y.
[32] Priority May 3, 1968
[33] France
[31] 150423

[54] SELECTION SYSTEM FOR CIRCUITS OR ELECTRIC EQUIPMENT
2 Claims, 10 Drawing Figs.

Figure 1:
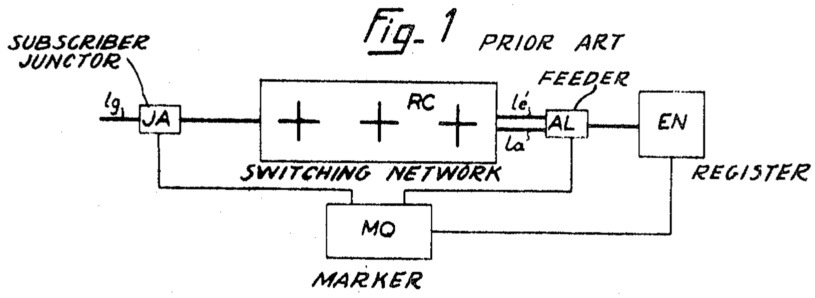
Fig. 1 PRIOR ART

[52] U.S. Cl. .......... 179/18 GF
[51] Int. Cl. .......... H04q 3/42
[50] Field of Search .......... 179/18.74, 18.74 A, 18 BT

[56] References Cited

UNITED STATES PATENTS 3,349,189 10/1967 Van Bosse .......... 179/18 (.74)
3,439,125 4/1969 Boehm .......... 179/18 (.74)
3,275,752 9/1966 Esperseth et al. .......... 179/18 GE

*Primary Examiner*—Kathleen H. Claffy
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden ABSTRACT: A switching network has three cascaded stages, each stage including a number of sections. Means associated with the secondary stage tests the availability of links in the primary and tertiary stages. When a match of idle primary and tertiary links is found, in association with an idle secondary link, the network operates to complete a path through all three stages.

SELECTION SYSTEM FOR CIRCUITS OR ELECTRIC EQUIPMENT

The present invention concerns a selection system for circuits or electric equipment, and, more particularly, a selection system making it possible to connect an individual equipment unit to a common equipment unit through a several stage connecting network. Such a system is applicable namely, though nonexclusively, in automatic telephone exchanges.

In a telephone exchange, every subscriber's line has at its end an individual equipment unit so-called subscriber's junctor which is able to detect the calls and to signal them to the common units in the exchange. These subscribers' junctors are connected to the outlets of a connecting network which can be made up of three selection stages so-called primary stage, secondary stage and tertiary stage. In each stage, the selectors are grouped into sections. One section is made up of a group of selectors which have their homologous outlets multiplied. The subscribers' junctors are distributed into groups, and, each group is connected to the outlets of a group of selectors of the primary stage, making up a primary section. Common equipment units, so-called feeders, are connected to the inlets of the switching network, that is to say to the inlets of the selectors of the tertiary stage. One inlet, and only one, of each primary section is connected to one outlet, and one outlet only, of a secondary section through a link so-called primary link. Thus a primary section can have access through, a single primary link to each secondary section and vice versa. Likewise, one inlet, and one inlet only, of each secondary section is connected to an outlet of a tertiary section through a link so-called secondary link. A secondary section can thus have access, by means of a single secondary link, to each tertiary section and vice versa. Between a primary section and a tertiary section there are, therefore, as many paths as there are secondary sections.

Each feeder has two accesses connected to two inlets of the tertiary stage, respectively. One of these accesses, so-called access calling-line-side, is provided for the connection of a calling line; and the other one, so-called access called-line-side, is provided for the connection of a called line. The feeder, as its name implies, has the function of feeding the calling and called lines with supply current. It also has the responsibility to transmit the ringing current along the called subscriber's line so as to keep operating his bell until he lifts his station receiver.

A call between two subscribers is established by first connecting the calling subscriber's line to the access calling-line-side of the feeder, through the connection network—and this constitutes the selection of the calling line; then, by connecting the called subscriber's line to the access called-line-side in a similar fashion this constitutes the selection of the called line.

The invention concerns a selection system which makes it possible to connect an individual equipment unit (subscriber's junctor) to a common equipment unit (feeder) through a three-stage connection network; and this in simple, economical fashion.

One feature of the invention is a selection system for circuits or electrical equipment comprising namely: a switching network made up of a primary stage formed up by primary sections, of a secondary stage formed up by secondary sections, of a tertiary stage formed up by tertiary sections, these various stages being linked to one another in such way that between every particular section of a stage and every particular section of a neighboring stage there should only exist a single connection so-called link; lines ended each by an individual line equipment unit and connected each to an outlet of a primary section; common equipment units connected each to an inlet of a tertiary section; a system for selecting a path between a determined line and a common equipment unit, said system comprising: means for identifying the primary section and the outlet in that primary section to which is connected the said line, means for identifying the tertiary section and the inlet in the tertiary section to which is connected the common equipment unit, means associated with each secondary section and each made up of a switchable test circuit for simultaneously testing, on the one hand, the availability of a link between the identified primary section and the considered secondary section, and, on the other hand, the availability of a link between the secondary section and the identified tertiary section, so that, the test circuit indicates if these two links are simultaneously available or not, that is to say, if the connection path joining the identified primary section to the identified tertiary section through the intermediary of the considered secondary section is available or not.

According to another feature of the invention, the test circuit associated with each secondary section is made up of a relay selectively connectable, on the one hand, to the link which connects one identified primary section to the secondary section, and, on the other hand, connectable to the link which connects that same secondary section to an identified tertiary section, through a decoupling circuit interdicting the transmission or potentials from one link upon another, the presence of a busy condition potential on one or the other of the links, preventing operation of the relay and marking that tested connection path is unavailable.

According to another feature of the invention, a choosing chain makes it possible to choose a path in the case where several test circuits have operated.

According to an alternative, another feature of the invention is a switching network designed in such fashion that there exist two links between any secondary section and any tertiary section; the path selection being then operated in two stages: during a first stage, each test circuit is connected to one of the two links, and then, if no path is available, during a second stage, each test circuit is connected to the other link.

Figure 4:
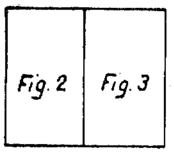
Figure 6:
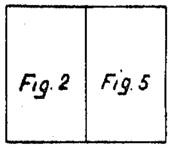
Figure 10:
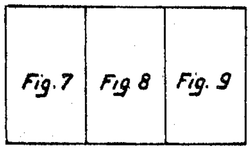
Figure 2:
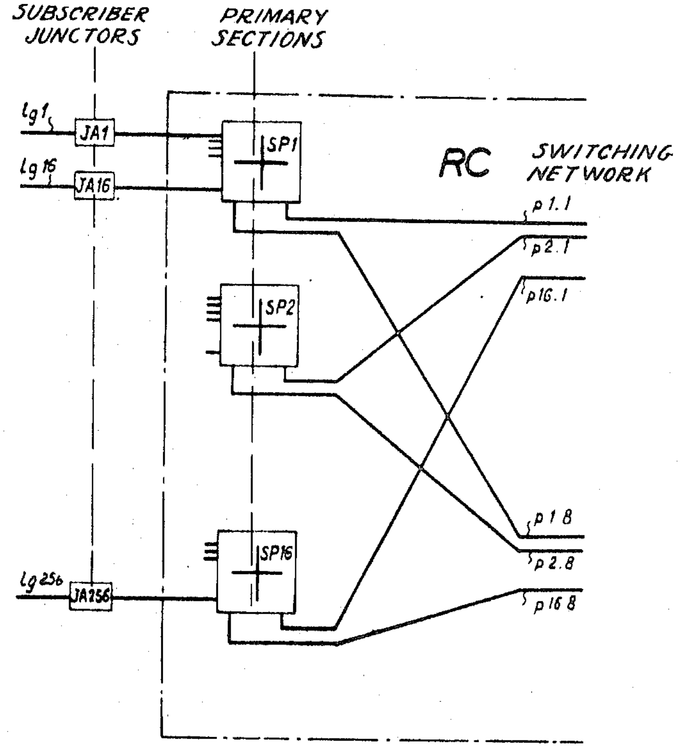
Figure 3:
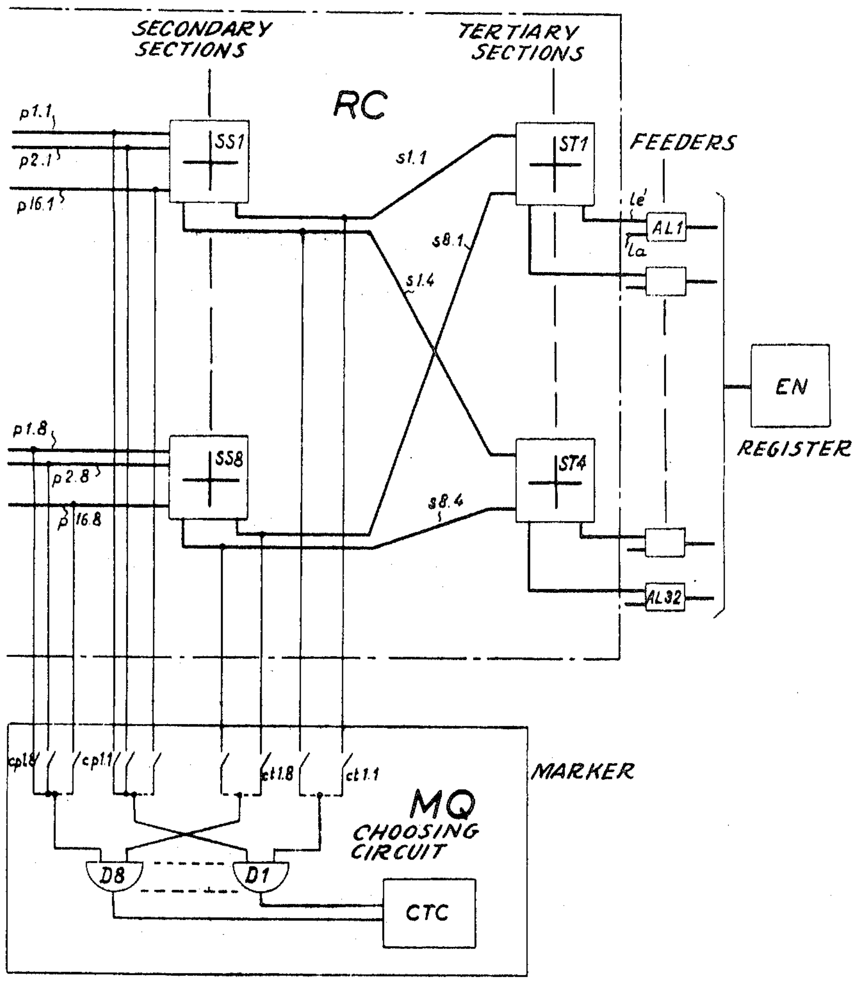
Figure 5:
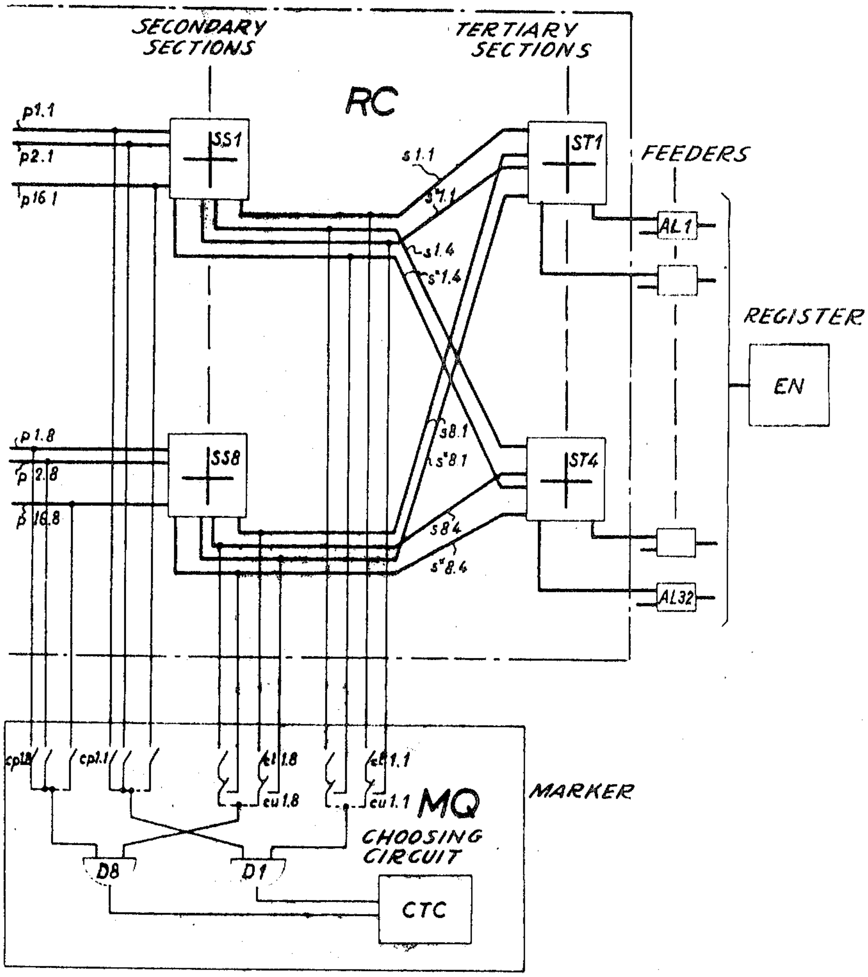
Figure 7:
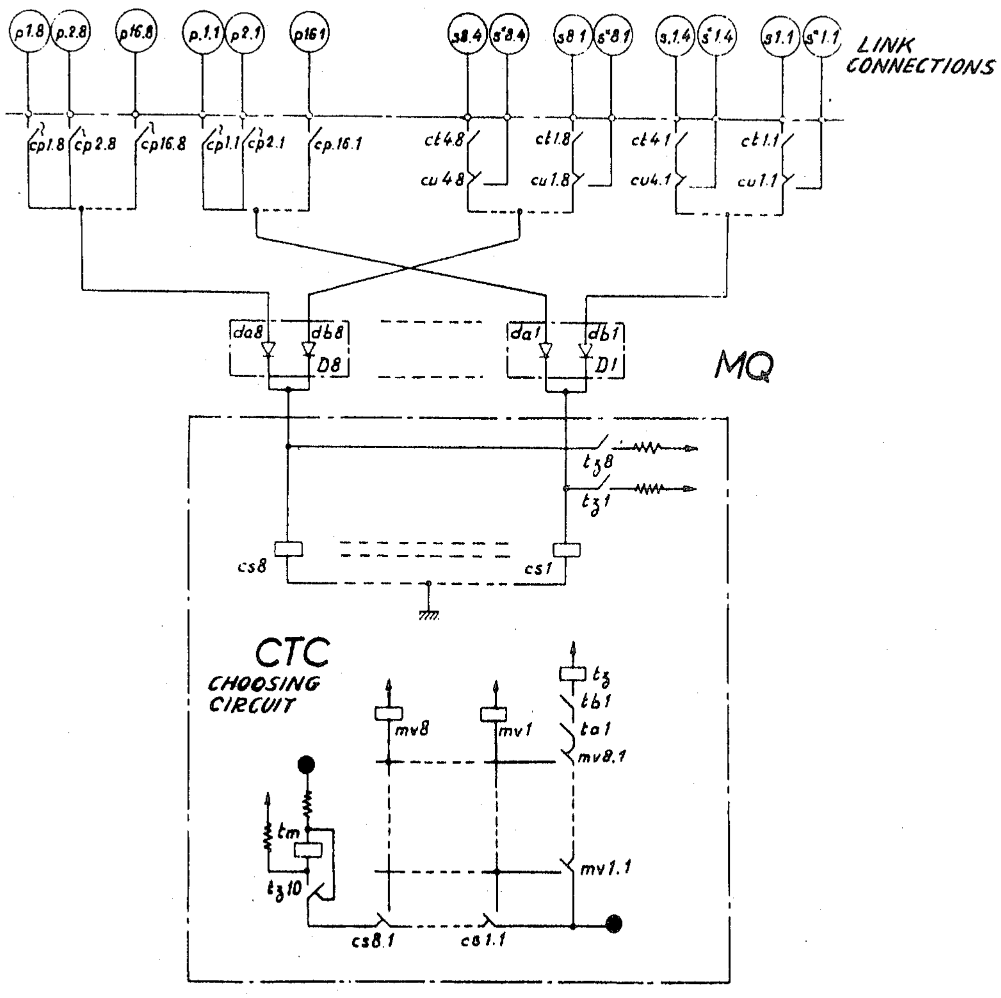
Figure 8:
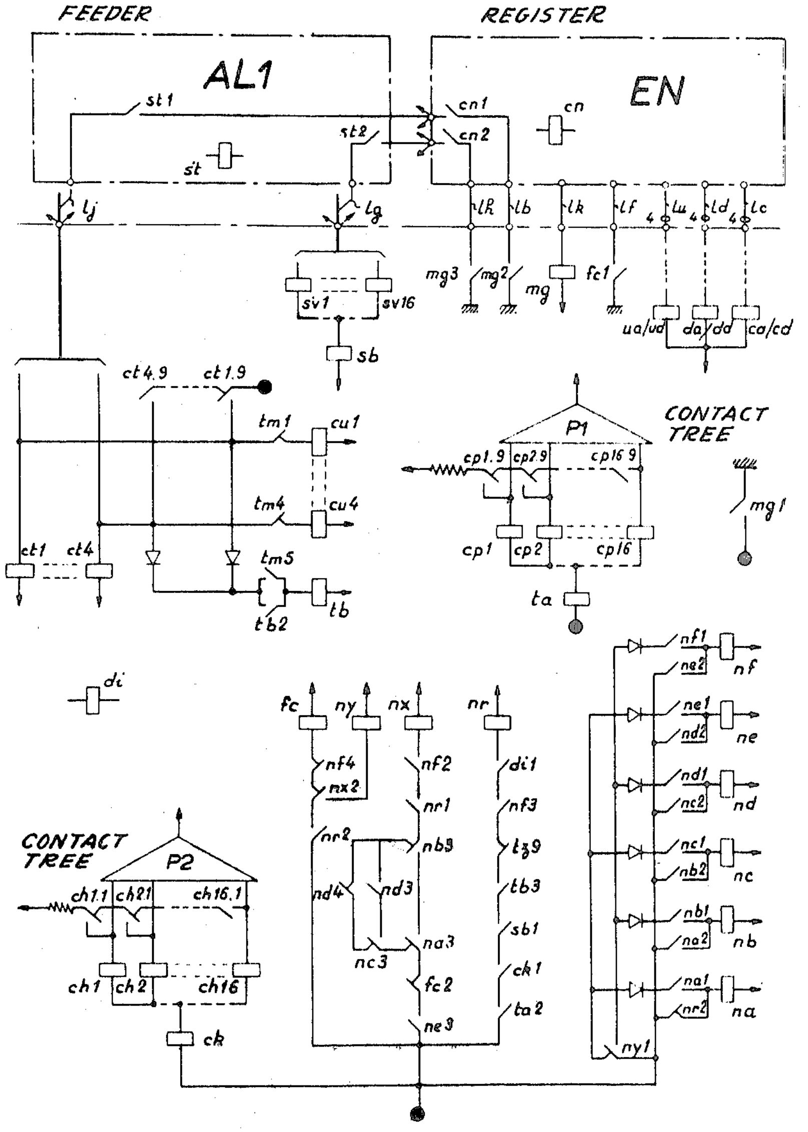
Figure 9:
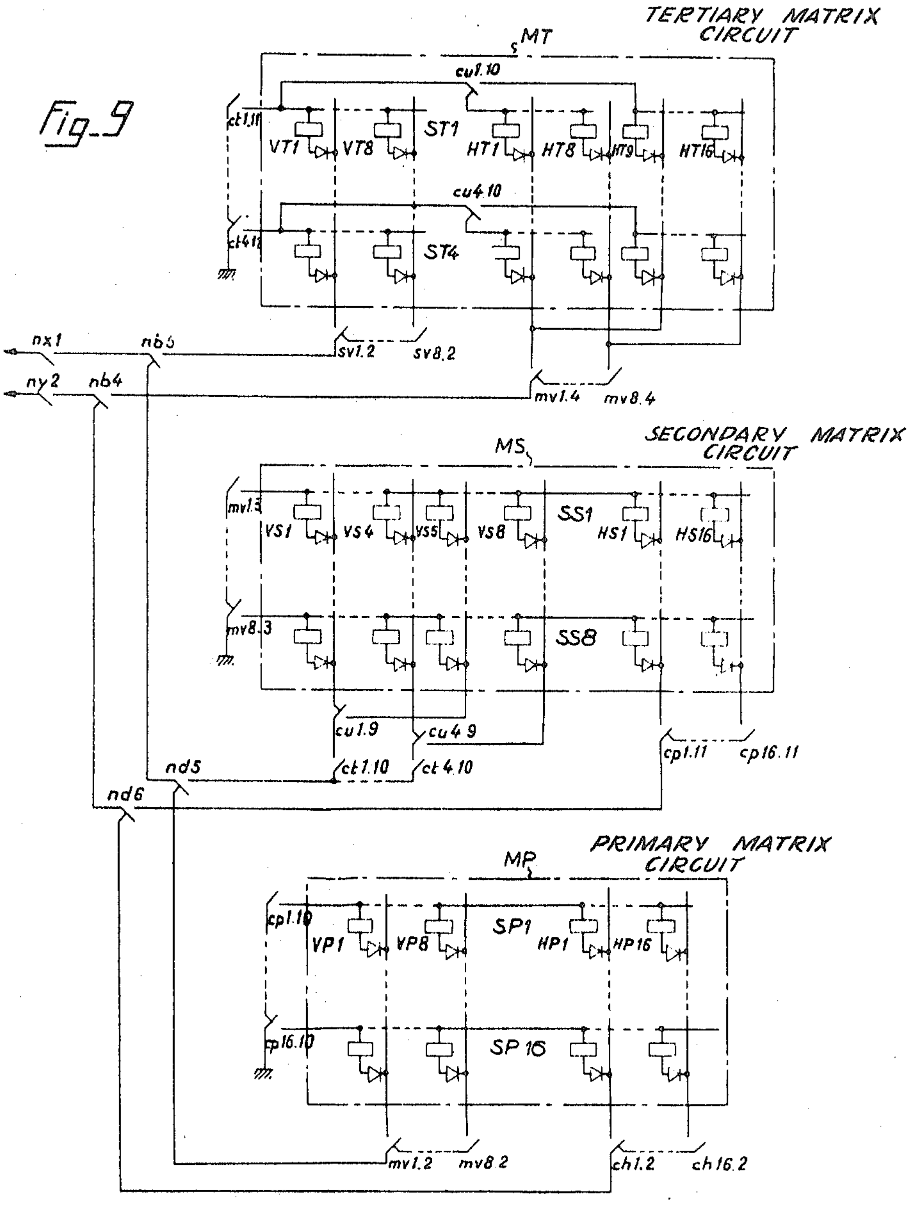

Different other features of the invention will become apparent from the description that follows, given by way of nonlimiting example, in conjunction with the accompanying drawings comprising:

FIG. 1, a block diagram of the connections in a telephone exchange to which the present invention can be applied;

FIG. 2, the diagram of the first stage of a switching network;

FIG. 3, the diagram of the second and third stages of a switching network which, assembled with the first stage of FIG. 2 will make up a three-stage switching network; as well as the essential means provided, according to the invention, for performing the selections in this network;

FIG. 4, the plan for assembling FIGS. 2 and 3;

FIG. 5, an alternative of the diagram of the second and third stages of a switching network, which, assembled with the first stage of FIG. 2 will make up an alternative of a three-stage switching network; as well as essential means provided, according to the invention, for performing the selections in this network;

FIG. 6, the plan for assembling FIGS. 2 and 5;

FIGS. 7, 8 and 9, assembled as shown by FIG. 10, are the detailed diagrams of a marker's circuits enabling the putting into operation of the selection system, object of the present invention;

FIG. 10, the plan for assembling FIGS. 7, 8 and 9.

In referring to FIG. 1, the description will first be given of a diagram of the connections in a telephone exchange to which the present invention can be applied. This exchange handles subscribers' lines such as 1*g*. These lines have at their ends, in the exchange, individual equipment units such as JA so-called subscriber's junctors. These junctors have as particular function to current-supply the lines when these latter are free, to detect the calls transmitted by the telephone stations and to have all this informed to a common unit, so-called marker.

The switching network RC comprises three selection stages (primary, secondary and tertiary). To the outlets of the network, that is to say to the outlets of the primary stage, are connected the subscribers' junctors JA; and, to the inlets of the tertiary stage, are connected common units such as AL, so-called feeders. A feeder has two accesses: the access 1*a*, so-called access calling-line-side, to which can be connected a calling line, and the access 1é, so-called access called-line-side, to which can be connected a called line. The feeder has for function to provide the supply current of the calling and called lines, to transmit the ringing current along the called subscriber's line, so as to keep the bell operating until the subscriber lifts his receiver, and, to isolate both accesses in order to operate the disconnection at the end of the call conversation. Moreover, the feeder can be connected to a common unit EN so-called register, which has mainly for function to transmit the dialing tone inviting the calling subscriber to dial and to receive the digits of the called number. Finally, the operation of the exchange is controlled by the marker MQ.

When the subscriber of a line, such as line 1*g*, lifts his receiver the junctor JA detects the call. The marker MQ identifies the output of the connection network to which is connected the line. It chooses a free-feeder, say for instance AL, and will thus know, consequently, the inlet of the connection network to which it is connected. It performs a selection between the identified outlet and inlet and then controls the connection. The line 1*g* is connected to the access 1*a* of the feeder. Simultaneously, under control of the marker MQ, the feeder AL is connected to a register such as EN. The marker MQ releases. The register EN transmits a dialing tone to the calling line 1*g* subscriber and receives, in return, the number of the called line. When it has received that number, the register EN calls the marker MQ, seizes it and transmits to it the number of the called line for establishing the call conversation. The marker MQ knows therefore the identity of the called subscriber's line and, consequently, the outlet of the connection network to which it is connected. It then identifies the feeder AL and the inlet to which is connected its access 1*é*. It performs a selection between the identified outlet and inlet and then controls connection of called line to access 1*é* of the feeder AL. The marker MQ finally releases, whereas the feeder AL keeps sending the ringing current along the called line until the subscriber answers. When answer is made, the call is established under the sole supervision of the feeder.

By referring to FIGS. 2 and 3, assembled as indicated in FIG. 4, the description will now be given of an embodiment of the switching network RC of FIG. 1 as well as the essential elements of the selection system of the invention. FIG. 2 represents the first stage of the switching network, FIG. 3 represents the second and third stages as well as the selection means. In order to render the explanations easier, a numerical example will be used here, without of course it limiting the scope of the present invention.

According to this example, the exchange will handle 256 subscribers' lines *lg*1 to *lg*256 which are ended by the junctors JA1 to JA256 respectively. They are distributed into 16 groups of 16 lines upon the outlets of 16 primary sections SP1 to SP16. Each primary section has therefore 16 outlets.

The secondary stage comprises eight secondary sections. Each of the primary sections is connected by a single link so-called primary link to each of the secondary sections. These links are referenced in the figure by a letter *p* followed by the primary section number and then by the secondary section number which they connect. Thus, the eight inlets of the primary section SP1 are connected respectively to the first outlets of the secondary sections SS1 to SS8 by the links *p*1.1 to *p*1.8. The eight inlets of section SP2 are connected respectively to the second outlets of the secondary sections SS1 to SS8 by the links *p*2.1 to *p*2.8. The eight inlets of section SP16 are connected respectively to the last outlets of the secondary sections SS1 to SS8 by the links *p*16.1 to *p*16.8.

The tertiary stage comprises four sections. Each tertiary section comprises as many outlets as there are secondary sections, same as each secondary section comprises as many inlets as there are tertiary sections. Each of the secondary sections is connected, by a single link so-called secondary link, to each of the tertiary sections. These links are referenced by the letter *s* followed by the secondary section number and then by the tertiary section number which they connect. Thus, the four inlets of the secondary section SS1 are connected respectively to the first outlets of the tertiary sections ST1 to ST4 by the links *s*1.1 to *s*1.4. The four inlets of the secondary section SS8 are connected respectively to the last outlets of the tertiary sections ST1 to ST4 by the links *s*8.1 to *s*8.4.

The result is that between a primary section and the secondary stage there are as many links as there secondary sections. Between a tertiary section and the secondary stage there are as many links as there are secondary sections.

To the inlets of the tertiary stage are connected the feeders such as AL1 to AL32.

The links of the connection network have at least three conductors: two line conductors and one signalling conductor. When a link enters into a connection, its signalling conductor is earthed by the common unit onto which this connection ends up. When a link is free, it will be considered being isolated.

Finally, the marker MQ of which certain elements only are shown in the figure, has a test and choosing circuit CTC enabling the testing and the choosing of a connection path between a primary stage outlet and an inlet of the tertiary stage, through the coincidence circuits D1 to D8, corresponding each to one of the secondary sections SS1 to SS8. The circuit D1, for instance, is assigned to section SS1. Its left inlet can be connected to the links *p*1.1 to *p*16.1 and its right inlet to the links *s*1.1 to *s*1.4.

It will be assumed that during a calling line selection, a calling line was connected to a feeder AL1, for instance, and, more precisely speaking, to the access *la* of that feeder. The register EN has received, from the calling subscriber, the number of the called line, say for instance the line *lg*1. It has seized the marker MQ and transmitted to it the number of the called line.

At selection of the called line, the marker must select a connection path between the access *lé* of feeder AL1 and the junctor JA1 of the line *lg*1.

The marker identifies the access *lé* of feeder AL1 and obtains its position which is characterized by the tertiary section (ST1 in the example taken here) and, in that section, by the inlet to which it is connected. On the other hand, the marker identifies, by means of the called line number (*lg*1), received from register EN, the position of that line, which defines the primary section (SP1) and, in that section, the outlet to which it is connected.

The marker must therefore select a path between the primary section SP1 and the tertiary section ST1. Contacts *cp*1.1 to *cp*1.8 corresponding to the primary section SP1 and contacts *ct*1.1 to *ct*1.8 corresponding to the tertiary section ST1 will close, controlled by means not shown in the figure, and connect the test and choosing circuit CTC, by the coincidence circuits D1 to D8, to the primary links and to the secondary links of the connection network. The circuit D8, for instance, is connected to the links *p*1.8 and *s*8.1. If the signalling wire of one or the other link is earthed, the circuit D8 provides a busy tone to the circuit CTC for indicating that the corresponding path is not free. Same applies for the seven other possible paths. The circuit CTC identifies the connection paths available between the section SP1 and the section ST1 and it chooses one, say for instance the path utilizing the section SS1. Then the marker controls the connection. The called subscriber's line *lg*1 is connected to the access *lé* of feeder AL1 through: line *lg*1, subscriber's junctor JA1, primary section SP1, sink *p*1.1, secondary section SS1, link *s*1.1, tertiary section ST1, access *lé* of feeder AL1.

By referring to FIGS. 2 and 5 assembled as shown in FIG. 6, an alternative of the switching network RC in FIG. 2 will now be described, with the provided corresponding arrangements, in the marker MQ, for performing selections. FIG. 5 illustrates the second and third stages of the switching network as well as the selection means. As can be seen, the primary stage and its links with the secondary stage are unchanged.

Each secondary section is connected by two links to each tertiary section. Thus, between a determined secondary section and a tertiary section, there are two secondary links. For instance, the secondary section SS1 is connected to the tertiary section ST1 by two links, links *s*1.1 and *s′*1.1. Likewise, the secondary section SS1 is connected to the tertiary section ST4 by the links *s*8.1, *s′*8.1 and *s*8.4, *s′*8.4.

To every secondary section there is assigned a coincidence circuit D1 to D8; the circuit D1, for instance, is assigned to the section SS1. Its left inlet can be connected to the links *p*1.1 to *p*16.1, and its right inlet to the links *s*1.1 to *s*1.4 and *s′*1.1 to *s′*1.4.

It is assumed that, as previously, a connection is to be established between the primary section SP1 and the tertiary section ST1. The marker performs first of all a first test identical to the preceding one. Contacts *cp*1.1 to *cp*1.8 corresponding to the primary section SP1, and, contacts *ct*1.1 and *ct*1.8 corresponding to the tertiary section ST1 close, controlled by means not shown in the figure and connect the circuit CTC, through the circuits D1 to D8, to the primary links and to the first group of secondary links. In each circuit D1 to D8, the availability of a primary link and of a secondary link is set into coincidence. In the circuit D1, for instance, the availability of the link *p*1.1 is set into coincidence with the availability of the link *s*1.1. If not a single one of the devices such as D1 responds positively to this test, the circuit CTC will be switched, by operation of contacts *cu*1.1 to *cu*1.8, onto the other links connecting the secondary sections to the same tertiary section ST1, and the same test will be performed again between the same primary links and the new secondary links. In the circuit D1, for instance, there is being set in coincidence the availability of the link *p*1.1 with the availability of the link *s′*1.1.

Referring to FIGS. 7, 8 and 9, the circuits will now be described which enable putting into operation the selection system of the present invention. The FIGS. 7, 8 and 9 must be assembled as indicated in FIG. 10. They correspond to a network RC such as the one of FIGS. 2 and 5 assembled, in which two links are provided between secondaries and tertiaries.

In these figures there are just shown the circuits of marker MQ, of register EN and of a feeder AL1, which are indispensable for understanding the present invention. The network RC is not shown in the figure and only the connections, between the marker and the various links, are indicated in FIG. 7 by a circle inside which is written the number of the link to which it leads. In FIG. 7 is found the testing and choosing circuit CTC, in FIG. 8 the marker control circuit, and in FIG. 9 the energizing circuits of the connection electromagnets.

The various circuits are realized by means of relays, contacts and diodes. A relay is illustrated by a rectangle bearing on either side the connections of a winding. It is referenced by two small letters followed by a number, in the case of homologous relays. According to the detached contact representation, the contacts controlled by a relay are arranged anywhere in the three FIGS. 7, 8 and 9. Indeed, since these three figures form up a whole and represent the circuits of marker MQ, certain contacts of a relay placed in one figure may happen to be in another figure. These contacts bear the reference symbol of the relay followed by a number. Thus, reference *ct*1.10 designates the contact 10, placed in FIG. 9, of *ct*1, placed in FIG. 8. Finally, it is worth mentioning that the various circuits are current-supplied by one same source of direct current, say a battery for instance, whose positive terminal is earthed. The circuits leading onto the negative terminal of that battery are ended by an arrow.

It will be assumed that, initially, a calling line (see FIGS. 2 and 5) is connected to an access *la* of feeder AL1 and that this latter is connected to the register EN. The relay *cn* of register EN and the relay *st* of feeder AL1 are energized. The marker is available and all its relays are at rest condition.

Moreover, it is assumed that the register will have just received the number of the called line, say *lg*1 for instance. The register seizes the marker by the application of an earth potential along the wire *lk*. This earth controls the energizing of the relay *mg*. The contact *mg*1 closes and connects a general operation earth. In order to simplify the figure, the general earth circuit is illustrated by black circles; one will admit of course that they are all connected directly.

The relay *tm* energizes by means of contacts *tz*10, *cs*8.1,...*cs* 1.1. The relay *na* energizes by means of contact *nr*2 and holds through its contact *na*1. The relays *nb*, *nc*, *nd*, *ne*, *nf* then energize successively through contacts *na*2, *nb*2, *nc*2, *nd*2, *ne*2. On the other hand, the register EN transmits to the marker MQ, by means not shown in the figure, the called line number. This transmission is performed in an appropriate code, say for instance a binary code; and this necessitates four transmission wires per digit. In the case of a three-digit number, the units digit is received on the relays *ua/ud*, along the wires *lu*; the tens digit is received on the relays *da/dd*, along the wires *ld*; and the hundreds digit is received on the relays *ca/cd*, along the wires *lc*.

The contacts of relays *ua/ud*, *da/dd* and *ca/cd* are arranged in the form of decoding contact trees P1 and P2 so as to decode the called line number. The position of that line in the primary stage to which it is connected is thus identified. The contact tree P1 marks the relay designating the primary section to which the called line belongs. In the example taken here (line *lg*1) the section SP1 is concerned, and the corresponding relay *cp*1 energizes through: battery, contact tree P1, relay *cp*1, relay *ta*, earth. The relay *ta* energizes in series with the relay *cp*1 so as to indicate that the identification of the primary section has taken place. These two relays hold through the contact *cp*1.9. The contact tree P2 marks the relay designating the outlet in the precedingly identified primary section (SP1), to which is connected the called line. In the present example, it is the outlet 1 that is concerned. The relay *ch*1 therefore energizes. The relay *ck* energizes in series with the relay *ch*1 so as to indicate that the identification of the outlet has indeed taken place and the two relays hold through the make contact *ch*1.1.

On the other hand, the marker must also identify the position of the feeder AL1 in the tertiary stage to which its access called-line side is connected. For that purpose the contacts *mg*2 and *mg*3 are closed and they apply an earth along the wires *lb* and *lh* respectively. The earth potential along wire *lh* is retransmitted by contact *cn*2, of the register, to all the feeders. The feeder AL1 retransmits it through its contact *st*2 and through means not shown in the figure, along a wire *lg* which is proper to it, to a relay which characterizes the inlet to which it is connected in the tertiary section. In the example taken here, the relay *sv*1 energizes. The relay *sb* energizes in series with the relay *sv* so as to indicate that the identification of the inlet, in the tertiary section to which is connected the feeder AL1, is done. The earth potential along the wire *lb* is retransmitted, by the contact *cn*1 of register EN, to all the feeders. The feeder AL1, which has its contact *st*1 closed, retransmits it along a wire *lj* which is proper to it, to a relay *ct*1 to *ct*4 corresponding to the tertiary section to which it is connected. In the example taken here, the feeder AL1 is connected to the section ST1 and the relay *ct*1 therefore energizes and will hold through its contact *ct*1.9. The relay *tb* energizes so as to indicate that the identification of the section, to which the feeder AL1 belongs, is done. The relay *tb* holds by its contact *tb*2. Decoupling diodes preventing the transmission of earth potential from contact *ct*1.9 onto the relays *ct* other than the relay *ct*1.

The contact *tb*1 closes. The relay *tz* energizes through contacts *tb*1, *ta*1, *mv*8.1,...*mv*1.1 and general earth. The contacts *tz*1 to 8 close, and this enables the operation of the testing and choosing circuit CTC. The contact *tz*10 operates. The relay *tm* is short-circuited but does not release.

The contacts *cp*1.1 to *cp*1.8 are closed and connect respectively the links *p*1.1 to *p*1.8 originated from the primary section SP1 and leading onto the various secondary sections SS1 to SS8, onto the diodes *da*1 to *da*8 of the circuits D1 to D8. The contacts *ct*1.1 to *ct*1.8 connect respectively the links *s*1.1 to *s*8.1, originated from the tertiary section ST1 and leading onto the various secondary sections SS1 to SS8, onto the diodes *db*1 to *db*8 of circuits D1 to D8. The diodes *da*1 to *da*8 and *db*1 to *db*8 are associated by pairs so that each of these circuits might provide the coincidence of the availabilities of a link, connecting the primary section SP1 to a secondary section, and of a link connecting the same secondary section to the tertiary section ST1; both links together making up a connection path between the primary section SP1 and tertiary section ST1. The availability of each link is indicated by the absence of an earth along its corresponding signalling wire.

According to the above example, it is intended to test the availability of links *p*1.1 to *p*1.8 and *s*1.1 to *s*1.8. If, for instance, link *p*1.8 is busy, an earth is present along its signalling wire. This earth is retransmitted by the diode *da*8 of the decoupling circuit D8 and it inhibits the battery provided by the contact *tz*8. The corresponding relay *cs*8 cannot therefore energize. Likewise, if the link *s*8.1 is busy, the busy condition earth is retransmitted, by the contacts *ct*1.8 and *cu*1.8, to the diode *db*8 of circuit D8. This earth inhibits the battery of contact *tz*8 and prevents the energizing of relay *cs*8. All the more so, if both links *p*1.8 and *s*8.1 are busy, the relay *cs*8 cannot energize. Whereas, the coincidence of the absence of any earth potential on two links tested by the same circuit such as links *p*1.1 and *s*1.1 tested by the circuit D1 enables energizing of the corresponding relay *cs*–*cs*1 in the example taken here by the contact *tz*1.

Several relays *cs* can energize simultaneously. These relays designate the possible paths, and thus, as was already seen above, the utilizable secondary sections. The contacts *cs*1.1 to *cs*8.1 of these relays close, and this enables designating one secondary section, and only one, per each energizing of a determined relay *mv*. For instance, the relay *cs*1 has energized. The closing of contact *cs*1.1 controls the energizing of relay *mv*1 with designates the secondary section SS1. The relay *mv*1 holds through its contact *mv*1.1. Operation of the contact *mv*1.1 controls also the release of relay *tz*, and this indicates that the choosing of a secondary section, through which the call can be established, is indeed done. The relay *tm* is disshort-circuited and holds.

The marker is now in possession of all the information elements which make it possible to effect a connection between the line *lg*1 and the feeder AL1. It knows:

for the primary stage, the identify of:

the primary section (SP1) to which is connected the line *lg*1 (relay *cp*1);

the outlet of the primary section (SP1) to which is connected the line *lg*1 (relay *ch*1);

the inlet of the primary section SP1 connected to the selected secondary section and which corresponds to the identity of the secondary section (relay *mv*1);

for the secondary stage, the identity of:

the secondary designated section (SS1) (relay *mv*1);

the outlet of the secondary section SS1 connected to the primary section (SP1) and which corresponds to the identity of that primary section (relay *cp*1);

the inlet of the secondary section SS1 connected to the identified tertiary section (ST1) and which corresponds to the identity of that tertiary section (relay *ct*1);

for the tertiary stage, the identity of:

the tertiary section (ST1) to which is connected the feeder;

the outlet of the tertiary section ST1 connected to the secondary section SS1 and which corresponds to the identity of that secondary section (relay *mv*1);

the inlet of the tertiary section ST1 to which is connected the feeder (relay *sv*1).

The marker also controls, by means not shown in the figure, the testing of the called line. This latter, supposed to be free, the relay *di* energizes by means not shown in the figure, the contact *di*1 closes and the marker will control the establishing of the connection.

Establishing the connection is performed by closing an appropriate connection point in each primary, secondary and tertiary stage.

It will be assumed that every section of a stage is made of a crossbar multiswitch of a well-known type, such as the one described in the U.S. Pat. No. 3,529,113 issued Sept. 15, 1970 to Vazquez for Miniature Crossbar Switch with Flexible Tape Selecting Means and Mechanical Latch. This multiswitch comprises selection bars, corresponding to the outlets; connection bars corresponding to the inlets. The selection bars are controlled by electromagnets so-called selection electromagnets, and, the connection bars are controlled by electromagnets so-called connection electromagnets. To establish a connection between an inlet and an outlet, the connection bar corresponding to the inlet is set by the energizing of its connection electromagnet, in order to release any connection previously row wires as there are sections. For instance, the connection electromagnets VP1 to VP8 and the selection electromagnets HP1 to HP16 of the primary section SP1 are connected to the wire of the upper row. The column wires are distributed into two groups. To each wire of the first group are connected the connection electromagnets having the same rank in the various sections. There are therefore as many column wires of the first group as there are connection bars in the primary sections. For instance, the electromagnet VP1 of rank 1 in the section SP1 is connected to the wire of the first column; and the electromagnet VP8 of rank 8 is connected to the wire of the eighth column. To each wire established by that connection bar. Then is set the selection bar corresponding to the outlet, through energizing of its selection electromagnet, and then the connection bar is released (release of the connection electromagnet); and this has for effect to establish the connection between the inlet and outlet. Then the selection bar is released. The connection holds mechanically.

The connection electromagnets and the selection electromagnets of the multiswitches of one same stage are controlled by matrix circuits MP for the primary stage, MS for the secondary stage, MT for the tertiary stage. To each row wire, of the matrix MP, are connected the connection and selection electromagnets belonging to the same section. There are therefore as many of the second group are connected the selection electromagnets having same rank in the various sections. There are therefore as many column wires of the second group as there are selection bars in the primary sections. The electromagnets HP1 to HP16, for instance, of the section SP1, are connected to the first and 16th column wires.

The matrices MS and MT are designed in the same fashion. However, in accord with the switching network shown in FIG. 5, two groups of column wires are provided for the connection electromagnets in the matrix MS; contacts *cu*1.10 to *cu*4.10 make it possible to pass from one group to the other. Likewise, two groups of row wires are provided for the selection electromagnets in the matrix MT, contacts *cu*1.9 *cu*4.9 making it possible to pass from one group to the other.

The energizing of an electromagnet is performed by applying an earth along a row wire and a battery onto a column wire. A decoupling diode is associated with each electromagnet. The establishing of the connections in the various stages is performed successively in the tertiary stage, the secondary stage and then the primary stage. This operation is controlled by a six-relay sequential circuit (*na*, *nb*, *nc*, *nd*, *ne*, *nf*).

The various preceding identifications having been performed, the relay *m* energized by the contacts *ta*2, *ck*1, *sb*1, *tb*3, *tz*9, *nf*3 and *di*1.

The contact *nr*1 closes. The relay *nx* energizes through the following circuit: battery, relay *nx*, contacts *nf*2, *nr*1, *nb*3, *fc*2, *ne*3 and earth.

The contact *nx*1 closes and controls the energizing of a connection electromagnet of matrix MT. In the example chosen here, the connection electromagnet VT1 of section ST1 energizes through: battery, contacts *nx*1, *nb*5, *sv*1.2, decoupling diode, electromagnet VT1 of section ST1, contacts *ct*1.11,...*ct*4.11, earth.

The contact *nx*2 closes and relay *ny* energizes through contacts *nr*2 and *nx*2.

The contact *ny*2 closes and controls the energizing of a selection electromagnet of the matrix MT. In the example chosen here, the electromagnet HT1 of the section ST1 energizes through the circuit: battery, contacts *ny*2, *nb*4, *mv*1.4, decoupling diode, electromagnet HT1 of section ST1, contacts *cu*1.10, *ct*1.11...*ct*4.11, earth.

The contact $ny1$ operates. The relay $na$ releases whereas the relay $nb$ holds through the contacts $nb1$ and $ny1$. The contact $na3$ opens. The relay $nx$ releases. The contact $nx1$ opens and removes the energizing battery from the connection electromagnet VT1. The electromagnet VT1 restores to rest condition. The connection point inside the tertiary section ST1 is established. The feeder AL1 is connected to the link $s1.1$ (see FIG. 5).

The contact $nx2$ operates and controls the release of relay $ny$ which cuts the energizing battery from the selection electromagnet HT1 by opening of its contact $ny2$. The electromagnet HT1 restores to rest condition.

The contact $ny1$ restores to its rest condition and breaks the circuit of the relay $nb$ which releases. The contacts $nb4$ and $nb5$ restore to their rest condition and rout the circuit of contacts $nx1$ and $ny2$ onto the matrix MS (contacts $nd5/6$ operating). The relay $nx$ energizes through: battery, relay $nx$, contacts $nf2$, $nr1$, $nb3$, $nd3$, $na3$, $fc2$, $ne3$, earth.

The contact $nx2$ operates, and controls the energizing of relay $ny$.

The contact $ny2$ closes and controls the energizing of the whereas the electromagnet of the matrix MT. In the example chosen here, the electromagnet HS1 of section SS1 energizes through: battery, contacts $ny2$, $nb4$, $nd6$, $cp1.11$, decoupling diode, electromagnet HS1 of SS1, contacts $mu1.3$,...$mv8.3$, earth.

The contact $ny1$ operates. The relay $nc$ releases whereas the relay $nd$ holds through the contacts $nd1$ and $ny1$. The contact $nc3$ opens. The relay $nx$ releases. The contact $nx1$ opens and removes the energizing battery from the electromagnet VS1. This latter restores to rest condition. The connection point inside the secondary section SS1 is established and the primary link $p1.1$ is connected to the secondary link $s1.1$ (see FIG. 5).

The contact $nx2$ operates and controls the release of relay $ny$ which cuts the energizing battery from the selection electromagnet HS1, by opening of contact $ny2$. The electromagnet HS1 restores to rest condition.

The contact $ny1$ restores to its rest condition and the relay $nd$ releases. The contacts $nd5/6$ restore to their rest condition and thus rout the circuits of contacts $nx1$ and $ny2$ onto the matrix MP. The contact $nd4$ closes and controls the energizing of the relay $nx$ through: battery, relay $nx$, contacts $nf2$, $nr1$, $nb3$, $nd4$, $nc3$, $na3$, $fc2$ and $ne3$.

The contact $nx1$ closes and controls the energizing of a connection electromagnet of matrix MP1. According to the example taken here, the electromagnet VP1 of primary section SP1 energizes through: battery, contacts $nx1$, $nb5$, $nd5$, $mv1.2$, decoupling diode, electromagnet VP1 of SP1, contacts $cp1.10$,... $cp16.10$, earth.

Contact $nx2$ closes and the relay $ny$ energizes. The contact $ny2$ closes and controls the energizing of the selection electro-magnet. For instance, the electro-magnet HP1 of SP1 energizes through: battery, contacts $ny2$, $nb4$, $nd6$, $ch1.2$, decoupling diode, electro-magnet HP1 of SP1, contacts $cp1.10$ ... $cp16.10$, earth.

Contact $ny1$ operates and controls the release of relay $ne$, and the latter controls the release of relay $nx$ through the opening of contact $ne3$. The contact $nx1$ opens. The connection electromagnet VP1 restores to rest condition. A connection point is established in the primary stage. The line $lg1$ is connected to the link $p1.1$ (FIG. 2) and, thus, the line $lg1$ is connected to the feeder AL1 through: line $lg1$, section SP1, link $p1.1$, section SS1, link $s1.1$, section ST1, feeder AL1.

Contact $nx2$ operates and controls the release of relay $ny$ which cuts the energizing battery from the selection electromagnet HP1 by opening of contact $ny2$. The electromagnet HP1 restores to rest condition. The contact $ny1$ restores to its rest condition, and this determines the release of relay $nf$. The contact $nf4$ closes. The end of connection relay $fc$ energizes and applies, by its contact $fc1$, an earth along the wire $lf$ onto the register EN in order to control the release of this latter. The relay $cn$ releases. The register removes the earth from wire $lk$. The relay $mg$ releases and disconnect the general operation earth. All the relays of the marker MQ release and the marker is released.

Establishing the connection process is terminated. The line $lg1$ is connected to the access $l\acute{e}$ of feeder AL1, and, by the feeder, to the calling line.

In the above description, it was assumed that the first group of tested secondary links enabled establishing a connection. If no path is available, that is to say if no relay $cs$ is energized, at the end of a certain time, the relay $tm$ releases in order to control the testing and choosing of a path by utilizing the second group of secondary links. The relay $tb$ holds by its contact 2. The contacts $tm1$ to $tm4$ close and connect the relays $cu1$ to $cu4$ to the wires $lj$. In the example considered here, the relay $cu1$ corresponding to relay $ct1$ energizes. The contacts $cu1.1$ to $cu1.8$ operate and rout the diodes $db1$ to $db8$ of the decoupling circuits D1 to D8 onto the links $s^r1.1$...,$s^r8.1$. The testing and choosing circuit performs then the testing and choosing of a path made up of a primary link ($p1.1$, for instance) and of a secondary link ($s^r$ 1.1, for instance). This testing and choosing are performed by energizing a relay $cs$ and a relay $mv$ ($cs1$ and $mv1$ for instance). The connection is then made as before, by the energizing and then restoring to rest condition of a connection electromagnet and of a selection electromagnet in each matrix, by marking the appropriate row wires and column wires. It is worth noting that in the matrix MT, the row wire of the connection electromagnets is marked by a contact $ct$ (contact $ct1.11$, for instance) and, the row wire of the selection electromagnets is marked by a contact $ct$ and a contact $cu$ operating ($ct1.11$, $cu1.10$, for instance). In the matrix MS, the column wire of the connection electromagnets is marked by a contact $ct$ and a contact $cu$ operating ($ct1.10$ and $cu1.9$, for instance).

It is understood the foregoing description of a specific embodiment of this invention is made by way of example only and is not to be considered as a limitation on its scope. All numerical details are provided to facilitate the descriptions and may vary with every case of application of the present invention.

SUMMARY

The invention concerns a selection system for circuits or electrical equipment comprising, namely: a switching network made up of a primary stage formed by primary sections, of a secondary stage formed by secondary sections, of a tertiary stage formed by tertiary sections, these various stages being connected one another in such way that between any particular section of a stage and any particular section of a neighboring stage there should exist only one connection so-called link; lines ended each by an individual line unit and connected each to an outlet of a primary section; common units connected each to an inlet of a tertiary section; a system for selecting a path between a determined line and a common unit. This system comprises means for identifying the primary section and the outlet in that primary section to which is connected the said line, means for identifying the tertiary section and the inlet in that tertiary section to which is connected the common unit, means associated with each secondary section and made up each of a switchable test circuit for simultaneously testing, on one hand, the availability of a link between the identified primary section and the concerned secondary section, and, on the other hand, the availability of a link between the secondary section and the identified tertiary section, so that the test circuit will indicate whether these two links are simultaneously available or not, that is to say if the connection path joining the identified primary section and the identified tertiary section, passing through the considered secondary section, is available or not.

We claim:

1. A selecting system for a switching network comprising three cascaded stages providing alternate paths through said network, each of said stages having a plurality of switching sections, line circuit means associated with the outlets of a tertiary stage, means for interconnecting the inlets and outlets of said three stages so that there is only one possible connection in each stage for any given one of said alternate paths through said stages, means associated with the central of said three stages for identifying the sections of said primary and tertiary stages including the end points of a desired switch path, a plurality of links interposed between stages, means for testing the links for the availability of idle paths through said secondary switch, means for selecting a path where availability is indicated for each of said three stages, said selecting means comprising a plurality of relays with one side of the winding of each relay connected to a primary stage outlet and the other side of said winding connected to a tertiary stage inlet, decoupling means between the relays of said plurality for isolating operating circuits to said relays.

2. The system of claim 1, further comprising chain circuit means for selecting between said relays when several alternate paths test idle.

* * * * *